United States Patent [19]

Endo et al.

[11] Patent Number: 5,734,982

[45] Date of Patent: Mar. 31, 1998

[54] RADIO COMMUNICATION SYSTEM

[75] Inventors: Hiroya Endo; Hitoshi Ueda, both of Tokyo, Japan

[73] Assignee: NEC Corporation, Tokyo, Japan

[21] Appl. No.: 640,448

[22] Filed: Apr. 30, 1996

[30] Foreign Application Priority Data

May 12, 1995 [JP] Japan ..................... 7-114333

[51] Int. Cl.$^6$ ..................... H04Q 7/20
[52] U.S. Cl. ................. 455/450; 455/62; 455/63
[58] Field of Search ............ 455/422, 450–452, 455/454, 455, 11.1, 16, 517, 524, 63, 62

[56] References Cited

U.S. PATENT DOCUMENTS

| | | | |
|---|---|---|---|
| 4,882,765 | 11/1989 | Maxwell et al. | 455/11.1 |
| 5,179,720 | 1/1993 | Grube et al. | 455/16 |
| 5,276,908 | 1/1994 | Koohgoli et al. | 455/63 |
| 5,475,866 | 12/1995 | Ruthenberg | 455/63 |

OTHER PUBLICATIONS

"Generic Criteria for Version 0.1 Wireless Access Communications System", *TR-INS-001313* Issue 1 Oct. 1993, revision 1 Jun. 1994, pp. 37 to 104.

*Primary Examiner*—Nguyen Vo
*Attorney, Agent, or Firm*—Young & Thompson

[57] ABSTRACT

A radio communication system includes a radio port, a fixed radio terminal, a memory unit, a notification unit, and a mobile radio terminal. The radio port communicates in a service area by using a predetermined radio frequency which is multiplexed by time division into a plurality of radio channels. The fixed radio terminal is stationarily set in the service area of the radio port and has a first transmission/reception unit for communicating with the radio port by using a radio channel which is permanently assigned in advance. The memory unit stores the radio channel assigned in advance to the fixed radio terminal. The notification unit provides information, including channel information stored in the memory unit, in the service area of the radio port through the radio port. The mobile radio terminal communicates with the radio port by using a radio channel not assigned to the fixed radio terminal on the basis of the channel information provided in the service area of the radio port.

8 Claims, 8 Drawing Sheets

| CHANNEL FOR FIRST FIXED TERMINAL | CHANNEL FOR SECOND FIXED TERMINAL | | | | | | CONTROL CHANNEL |
|---|---|---|---|---|---|---|---|
| $23_1$ | $23_2$ | $23_3$ | $23_4$ | $23_5$ | $23_6$ | $23_7$ | $23_8$ |

| CHANNEL FOR THIRD FIXED TERMINAL | | | | | | | CONTROL CHANNEL |
|---|---|---|---|---|---|---|---|
| $24_1$ | $24_2$ | $24_3$ | $24_4$ | $24_5$ | $24_6$ | $24_7$ | $24_8$ |

22

RADIO COMMUNICATION SYSTEM

BACKGROUND OF THE INVENTION

The present invention relates to a radio communication system for performing communication between a radio port of a switching station and a fixed or mobile radio terminal and, more particularly, to a radio communication system capable of performing communication with both the fixed and mobile radio terminals through one radio port.

Terminals used in a radio communication system are classified into fixed radio terminals which are stationarily set and mobile terminals whose setting locations change. For subscribers, fixed radio terminals must ensure speech lines at any time like a terminal connected to a switching station through a cable. Mobile radio terminals including portable telephones can be used to make a call while the user is walking or moving. However, communication is not always enabled depending on the reception field strength at a destination.

FIG. 8 schematically shows the configuration of a conventional radio communication system. This radio communication system performs communication with radio terminals in first and second service areas $101_1$ and $101_2$. A first radio port $102_1$ is a communication port communicating with fixed radio terminals $103_1$ to $103_3$ and covers the first service area $101_1$. A second radio port $102_2$ is a communication port communicating with mobile radio terminals $104_1$ to $104_3$ and covers the second service area $101_2$. A radio port controller 105 manages frequencies used by the radio ports $102_1$ and $102_2$ and channels assigned for communication with the radio terminals $103_1$ to $103_3$ and $104_1$ to $104_3$. The radio port controller 105 is connected to a network (not shown) and allows communication with another terminal through the network.

The radio port controller 105 assigns a frequency f1 to uplinks and a frequency f1' to downlinks between the first radio port $102_1$ and the fixed radio terminals $103_1$ to $103_3$. In addition, the radio port controller 105 assigns a frequency f2 to uplinks and a frequency f2' to downlinks between the second radio port $102_2$ and the mobile radio terminals $104_1$ to $104_3$. Each frequency has eight time slots set by time division. Of these time slots, the eighth slot is used as a control channel while the remaining first to seventh slots are assigned for communication with the radio terminals $103_1$ to $103_3$ and $104_1$ to $104_3$. These speech channels are assigned to the radio terminals $103_1$ to $103_3$ and $104_1$ to $104_3$ every time the terminals output service requests.

The radio port controller 105 notifies the radio terminals $103_1$ to $103_3$ and $104_1$ to $104_3$ of idle radio channels in each frequency as accessible slots capable of responding to a service request. This information is periodically broadcasted in the service areas by using the control channels in the corresponding frequencies. When a line must be ensured, each of the fixed radio terminals $103_1$ to $103_3$ and the mobile radio terminals $104_1$ to $104_3$ outputs a service request through any one of the notified accessible slots. The fixed radio terminals $103_1$ to $103_3$ and the mobile radio terminals $104_1$ to $104_3$ perform communication with the corresponding radio ports $102_1$ and $102_2$ in the first and second service areas $101_1$ and $102_2$, respectively. A radio communication system in which accessible channels in each frequency are informed, and channel assignment is performed in accordance with service requests from radio terminals $103_1$ to $103_3$ and $104_1$ to $104_3$ is disclosed in detail in the following reference ("Generic Criteria for Version 0.1 Wireless Access Communications System", TR-INS-001313 Issue 1 Bellcore (1993)).

The mobile radio terminals $104_1$ to $104_3$ select a frequency with a high communication quality at a destination to perform communication. For this reason, the mobile radio terminals $104_1$ to $104_3$ and the fixed radio terminals $103_1$ to $103_3$ rush to take accessible slots. In some cases, all the accessible slots are occupied by the mobile radio terminals $104_1$ to $104_3$. Without idle slots, service requests from the fixed radio terminals $103_1$ to $103_3$ cannot be received, so a communication enable state cannot always be provided to the fixed radio terminals $103_1$ to $103_3$, like a wire terminal.

In addition, assume that a given one of the fixed radio terminals $103_1$ to $103_3$ and a given one of the mobile radio terminals $104_1$ to $104_3$ have the same subscriber, i.e., the same subscriber number. When the given terminals are present in one area, discrimination between these terminals cannot be made. For this reason, in the service area of the given one of the fixed radio terminals $103_1$ to $103_3$, the given one of the mobile radio terminals $104_1$ to $104_3$ which has the same subscriber number as that of the given fixed radio terminal cannot output a service request.

SUMMARY OF THE INVENTION

It is the first object of the present invention to provide a radio communication system for allowing a fixed radio terminal to ensure a channel at any time.

It is the second object of the present invention to make it possible to use a fixed radio terminal and a mobile radio terminal having the same subscriber number as that of the fixed radio terminal in the service area of the same radio port.

In order to achieve the above objects, according to the present invention, there is provided a radio communication system comprising a radio port for performing communication in a service area by using a predetermined radio frequency which is multiplexed by time division into a plurality of radio channels, a fixed radio terminal stationarily set in the service area of the radio port, the fixed radio terminal having first transmission/reception means for performing communication with the radio port by using a radio channel which is permanently assigned in advance, memory means for storing the radio channel assigned in advance to the fixed radio terminal, notification means for notifying information including channel information stored in the memory means in the service area of the radio port through the radio port, and a mobile radio terminal for performing communication with the radio port by using a radio channel not assigned to the fixed radio terminal on the basis of the channel information notified in the service area of the radio port.

BRIEF DESCRIPTION OF THE DRAWINGS

FIGS. 2A and 2B are views showing an example of radio channel assignment of each frequency in the system shown in FIG. 1;

DESCRIPTION OF THE PREFERRED EMBODIMENT

An embodiment of the present invention will be described below in detail.

Figure 1:
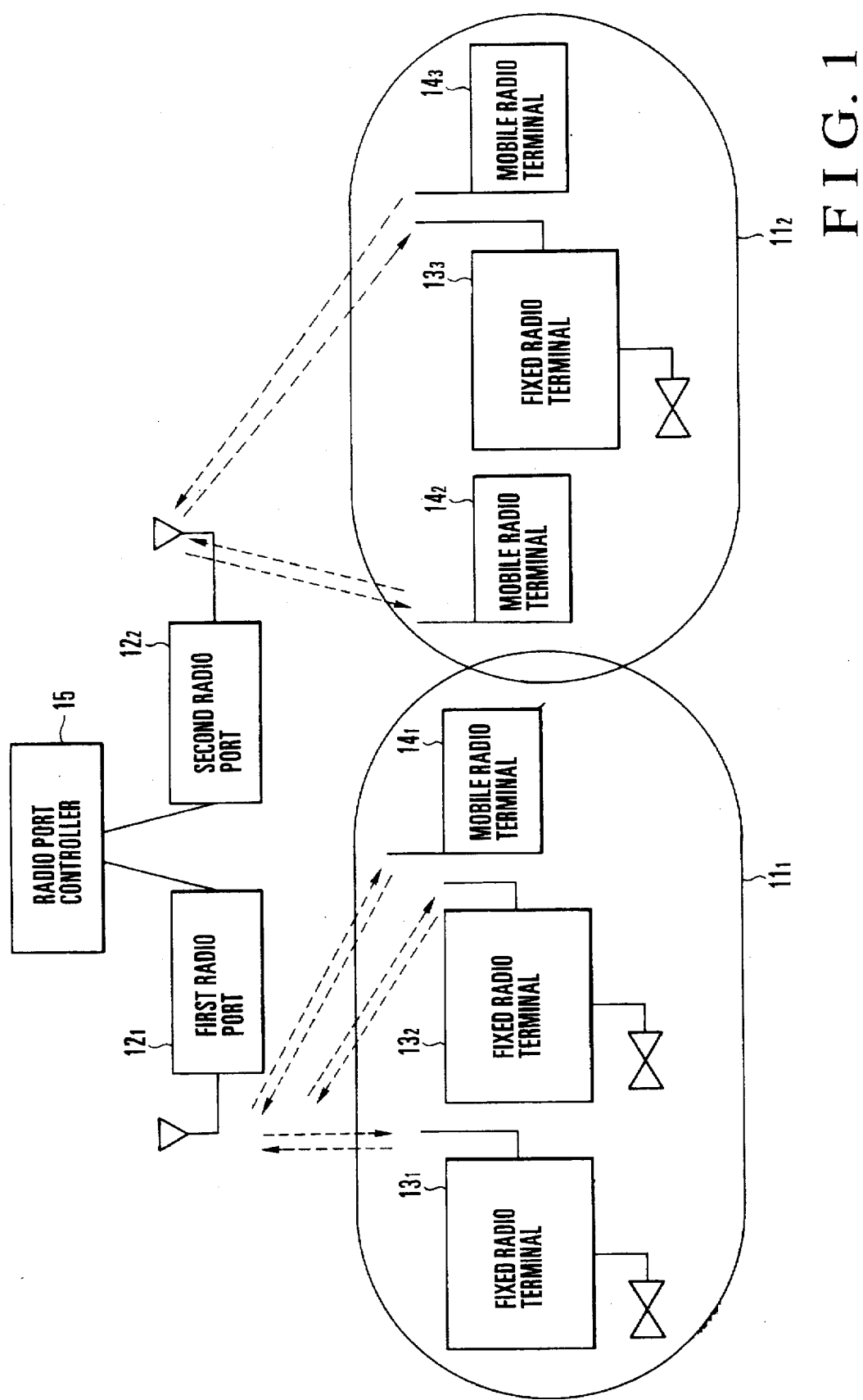
FIG. 1 is a view showing the system configuration of a radio communication system according to an embodiment of the present invention.

FIG. 1 shows the system configuration of a radio communication system according to an embodiment of the present invention. This radio communication system has first and second service areas $11_1$ and $11_2$. A first radio port $12_1$ is a communication port communicating with fixed radio terminals $13_1$ and $13_2$ and a mobile radio terminal $14_1$ in the first service area $11_1$. In FIG. 1, the mobile radio terminal $14_1$ is present in the first service area. However, if another mobile radio terminal enters this area, this mobile radio terminal communicates with the first radio port $12_1$. A second radio port $12_2$ is a communication port communicating with mobile radio terminals $14_2$ and $14_3$ and a fixed radio terminal $13_3$. A radio port controller 15 manages frequencies used by the radio ports $12_1$ and $12_2$ and channels assigned for communication with the radio terminals. The radio port controller 15 is connected to an ISDN (Integrated Service Digital Network) which is not illustrated.

The radio port controller 15 assigns a frequency f1 to uplinks and a frequency f1' to downlinks between the first radio port $12_1$ and the radio terminals $13_1$, $13_2$, and $14_1$ in the first service area $11_1$. The radio port controller 15 assigns a frequency f2 to uplinks and a frequency f2' to downlinks between the second radio port $12_2$ and the radio terminals $13_3$, $14_2$, and $14_3$ in the second service area $11_2$. The radio terminals in the service areas perform communication using the frequencies assigned to the radio ports in the corresponding areas.

FIGS. 2A and 2B show an example of radio channel assignment of each frequency. Radio channel assignment of each frequency shown here is applied to a case wherein the fixed radio terminals are arranged as shown in FIG. 1. Each of the frequencies f1, f1', f2, and f2' has eight time slots set by time division. The frequencies f1 and f1', and the frequencies f2 and f2' have the same time slot assignments, respectively. As shown in FIG. 2A, of time slots 21 corresponding to the repetitive period of the frequency f1 or f1', a first time slot $23_1$ is permanently assigned for communication with the fixed radio terminal $13_1$ shown in FIG. 1. A second time slot $23_2$ of the frequency f1 or f1' is similarly permanently assigned to the fixed radio terminal $13_2$.

The third to seventh time slots $23_3$ to $23_7$ of the frequency f1 or f1' are assigned to the mobile radio terminal $14_1$ in the first service area $11_1$. An eighth time slot $23_8$ is permanently assigned as a control channel for transmitting various types of information including idle channel information. The fixed radio terminals $13_1$ and $13_2$ arranged in the first service area $11_1$ communicate with the first radio port $12_1$ through the corresponding radio channels which are permanently assigned. The mobile radio terminal $14_1$ in the first service area $11_1$ outputs a service request through any one of the third to seventh time slots $23_3$ to $23_7$.

As shown in FIG. 2B, a first time slot $24_1$ of the frequency f2 or f2' of the second radio port is permanently assigned for communication with the fixed radio terminal $13_3$ which is stationarily set in the second service area $11_2$. Second to seventh time slots $24_2$ to $24_7$ are used as channels for mobile radio terminals. An eighth time slot $24_8$ of the frequency f2 or f2' is assigned as a control channel. The fixed radio terminal $13_3$ arranged in the second service area $11_2$ performs communication through the first channel $24_1$ of the frequency f2 or f2'. The mobile radio terminal $14_2$ or $14_3$ in the second service area $11_2$ performs communication by ensuring any one of the second to seventh time slots $24_2$ to $24_7$.

Figure 3:
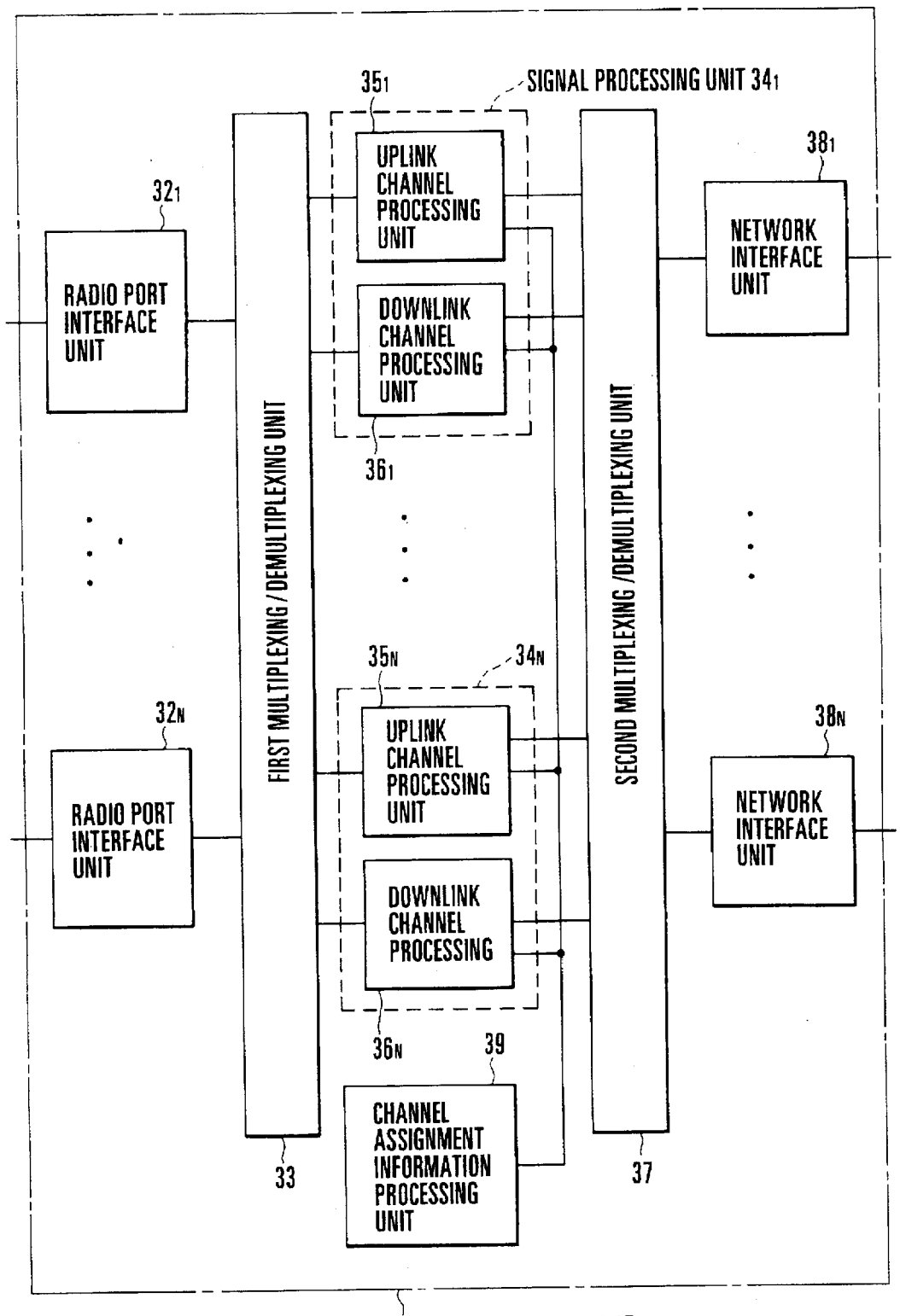
FIG. 3 is a block diagram schematically showing the arrangement of a radio port controller shown in FIG. 1.

FIG. 3 schematically shows the arrangement of the radio port controller shown in FIG. 1. The radio port controller 15 can be connected to N (N is an arbitrary positive integer) radio ports. Radio port interface units $32_1$ to $32_N$ are circuits for inputting/outputting signals to/from the corresponding radio ports. The radio port interface units $32_1$ to $32_N$ are connected to a first multiplexing/demultiplexing unit 33. The first multiplexing/demultiplexing unit 33 is a circuit for performing time-division multiplexing of signals in units of time slots and demultiplexing of the multiplexed signals in units of time slots. Signal processing units $34_1$ to $34_N$ are connected to the first multiplexing/demultiplexing unit 33 in correspondence with the radio ports.

The signal processing units $34_1$ to $34_N$ have uplink channel processing units $35_1$ to $35_N$ for performing signal processing for uplink radio channels, and downlink channel processing units $36_1$ to $36_N$ for performing signal processing for downlink radio channels. A second multiplexing/demultiplexing unit 37 is a circuit for multiplexing/demultiplexing signals in accordance with an interface to the ISDN switching system. Network interface units $38_1$ to $38_N$ are connected to the second multiplexing/demultiplexing unit 37 to input/output signals to/from the ISDN switching system. All the signal processing units $34_1$ to $34_N$ are connected to a channel assignment information processing unit 39. The channel assignment information processing unit 39 stores radio channel assignment information. In the radio communication system shown in FIG. 1, the frequencies used by the first and second radio port $12_1$ and $12_2$ and time slot assignment in each frequency shown in FIG. 2 are stored in the channel assignment information processing unit 39 serving as a memory means.

A sequence in assigning the radio channels to the radio terminals in the radio communication system with the above arrangement will be described below.

Figure 4:
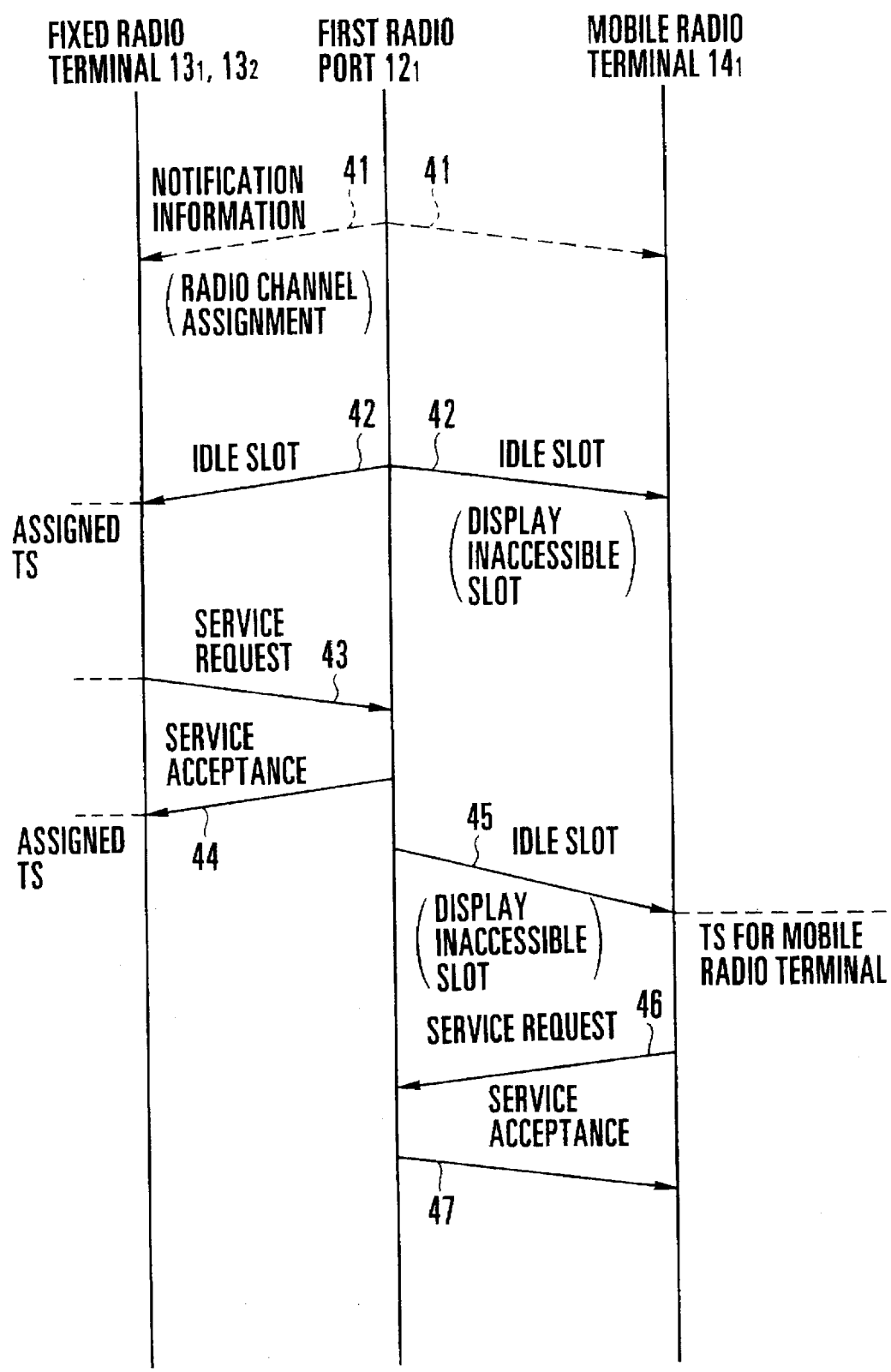
FIG. 4 is a timing chart showing a communication sequence in ensuring a radio channel in the system shown in FIG. 1.

FIG. 4 shows a communication sequence performed in ensuring a radio channel in the first service area $11_1$ of the radio communication system shown in FIG. 1. A vertical line on the left side indicates the fixed radio terminal $13_1$ or $13_2$. A vertical line at the center indicates the first radio port $12_1$. A vertical line on the right side indicates the mobile radio terminal $14_1$. Time elapses downward in FIG. 4. The radio port controller 15 provides notification information 41 representing the usable/unusable state of channels to the area through the radio port $12_1$ on the basis of the information stored in the channel assignment information processing unit 39. The information related to the fixed radio terminal that is provided, includes the identifier of the radio port where the fixed radio terminal is accommodated, the frequencies in use, and the time slot numbers permanently assigned in the frequencies.

Therefore, the fixed radio terminal $13_1$ is informed that the radio port is the first radio port $12_1$, the frequencies in use are the frequency f1 for the uplink and the frequency f1' for the downlink, and the stationarily assigned channel is the first channel $23_1$. The fixed radio terminal $13_1$ or $13_2$ stores these pieces of information as notification information and thereafter outputs a service request through the assigned channel.

Idle slot information 42 indicating whether each slot is accessible or not from the first radio port $12_1$ is notified every predetermined period. The channel permanently assigned to the fixed radio terminal $13_1$ or $13_2$ is handled as an inaccessible slot in the idle slot information 42. Even when an inaccessible slot is notified in the idle slot information 42, the fixed radio terminal $13_1$ or $13_2$ uses the assigned radio channel which has been provided with the notification information 41 to output a service request 43.

Upon reception of the service request, the radio port controller 15 determines the normality of the service request on the basis of the radio frequency of the service request, the time slot number, and the subscriber number of the fixed radio terminal $13_1$ or $13_2$ which has output the service request. In the radio port controller 15, the subscriber number assigned to the fixed radio terminal $13_1$ or $13_2$ is stored in advance in the channel assignment information processing unit 39. On the basis of this information, matching between the subscriber number for the service request and the radio channel is determined. For example, a service request received from the mobile radio terminal $14_1$ through the radio channel assigned to the fixed radio terminal $13_1$ or $13_2$ is rejected. If the service request is normal, the radio port controller 15 informs the radio terminal $13_1$ or $13_2$ of a service acceptance 44 representing that the service request has been accepted.

On the other hand, the mobile radio terminal $14_1$ outputs a service request 46 through an accessible time slot on the basis of received idle information 45. The radio port controller 15 determines whether the service request is normal, as described above. If the service request is normal, a service acceptance 47 is sent back. The radio port controller 15 stores the time slot through which the service request has been accepted. Thereafter, in a busy state, this channel is notified as an inaccessible slot. In addition, when an idle slot degrades in its transmission quality, the radio port controller 15 informs the terminal of the slot as an inaccessible slot.

As described above, time slots in one frequency are distributed to fixed radio terminals and mobile radio terminals, so that both the fixed and mobile radio terminals can be handled through the same radio port. For the fixed radio terminals, channels are permanently assigned to the respective terminals in advance. With this arrangement, even when the number of mobile radio terminals in one service area increases, and a lot of service requests are output, channels for the fixed radio terminals can always be ensured.

First Modification

In the first modification, a fixed radio terminal has a repeater function. The repeater area is relatively small, e.g., only in the house of a person, the garden, and the frontage. In the house or frontage, a radio wave from the radio port becomes weaker. For this reason, when the mobile terminal is present in this area, the fixed radio terminal relays the radio wave to the radio port.

Figure 5:
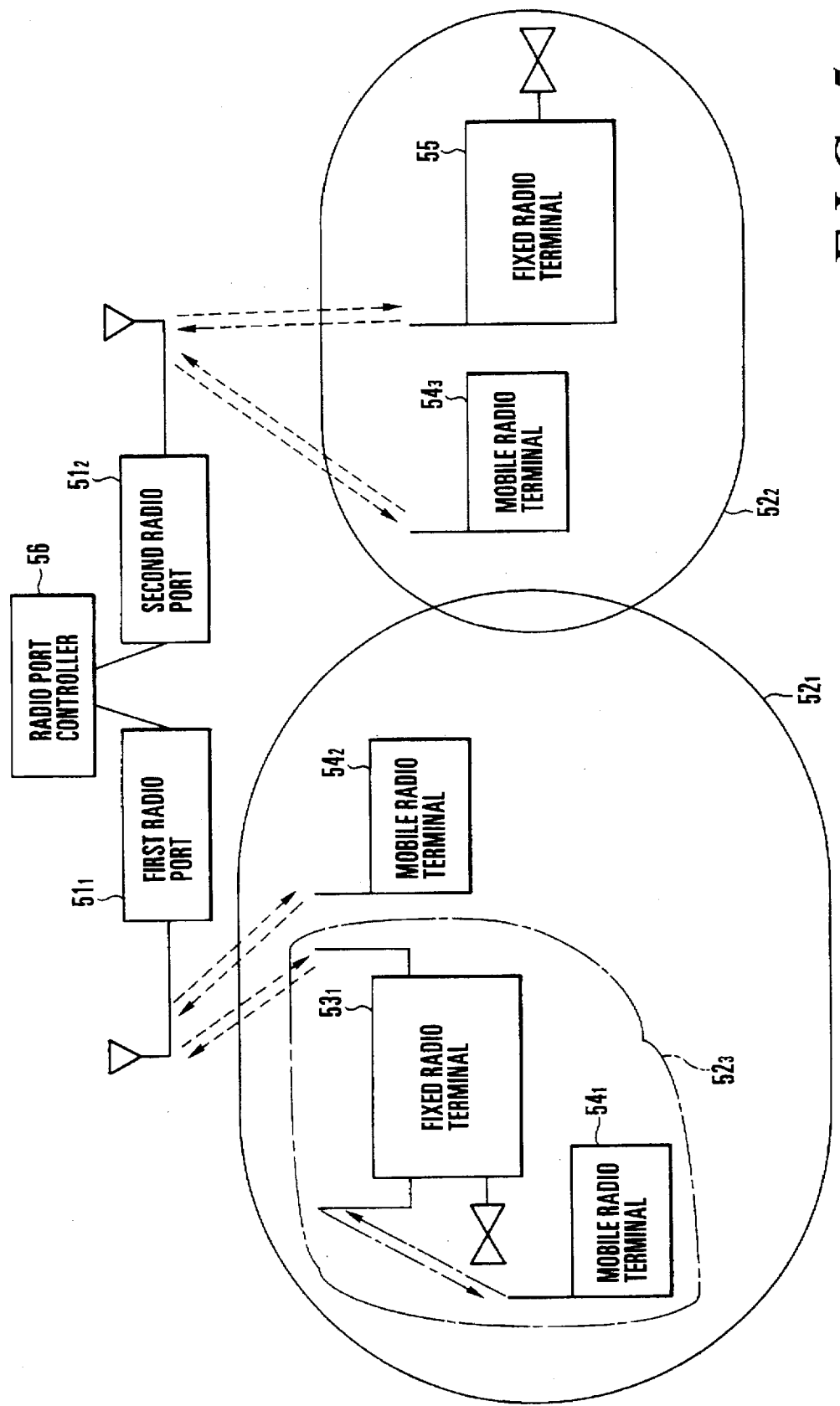
FIG. 5 is a view showing the first modification of the system configuration of the system shown in FIG. 1.

FIG. 5 schematically shows the configuration of the radio communication system of the first modification. For a first radio port $51_1$, the radio frequencies f1 and f1' are assigned for communication between a fixed radio terminal $53_1$ and a mobile radio terminal $54_2$ in a service area $52_1$. For a second radio port $51_2$, the radio frequencies f2 and f2' are assigned for communication between a fixed radio terminal 55 and a mobile radio terminal $54_3$ in a second service area $52_2$. The fixed radio terminal $53_1$ arranged in the first service area $52_1$ has a function as a repeater station. The fixed radio terminal $53_1$ performs transmission/reception with respect to a mobile radio terminal $54_1$ present in a third service area $52_3$ in the service area $52_1$ by using frequencies f3 and f3', and this communication is relayed to the first radio port $51_1$ by using an accessible slot in the frequency f1 or f1'. A radio port controller 56 has the same function as of the radio port controller 15 in FIG. 1. The radio frequency used for communication with the mobile radio terminal $54_1$ will be referred to as a fixed-mobile repeater frequency hereinafter. To relay the mobile radio terminal $54_1$, the fixed radio terminal $53_1$ communicates with the radio port through a channel which is permanently assigned to the fixed radio terminal $53_1$.

Figure 6:
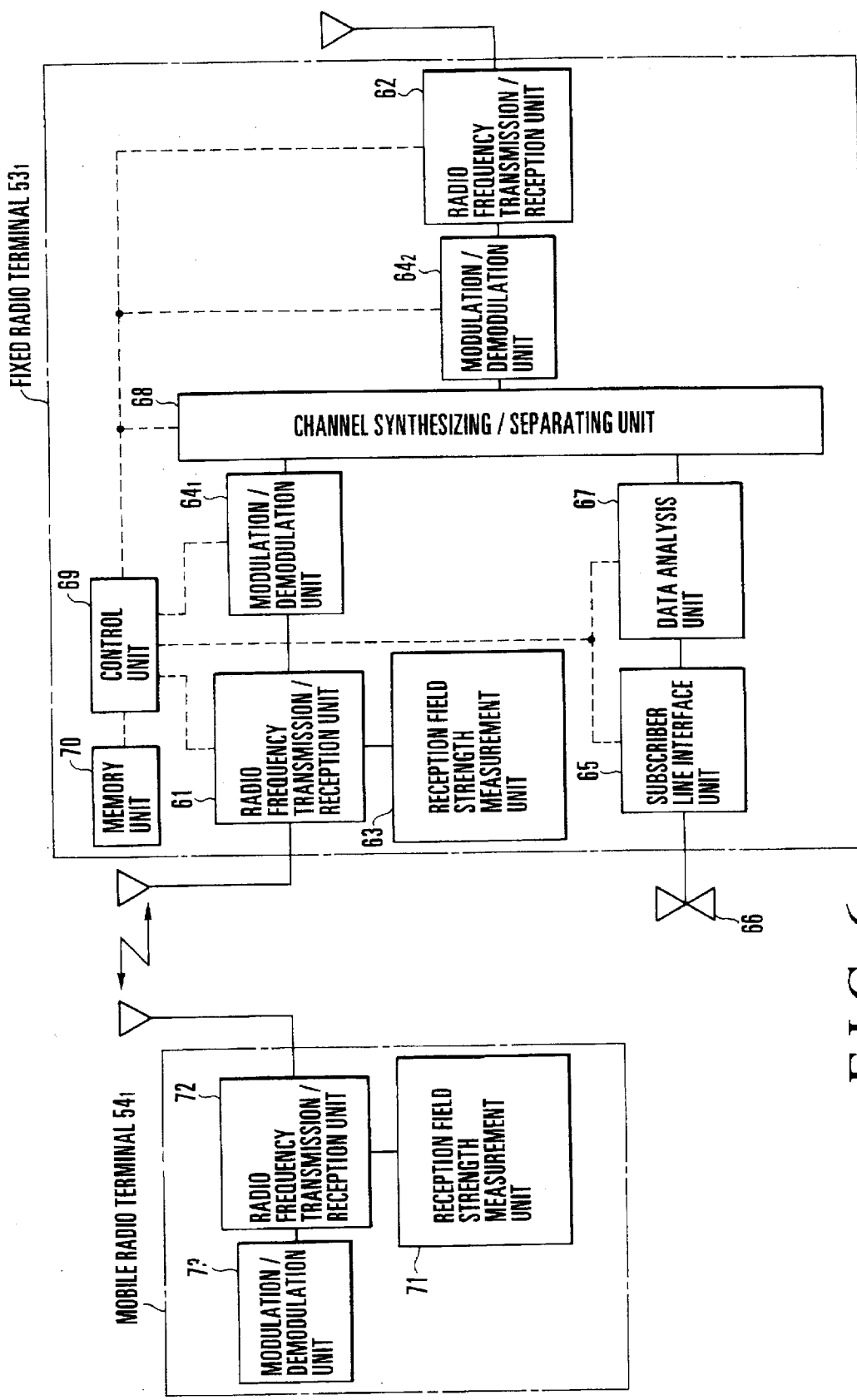
FIG. 6 is a block diagram schematically showing the arrangement of a fixed radio terminal and a mobile radio terminal shown in FIG. 5.

FIG. 6 schematically shows the arrangement of the fixed radio terminal $53_1$ and the mobile radio terminal $54_1$ shown in FIG. 5. A radio frequency transmission/reception unit 61 is a transmission/reception circuit communicating with the mobile radio terminal $54_1$ in the third service area $52_3$ shown in FIG. 5. A radio frequency transmission/reception unit 62 is a transmission/reception circuit communicating with the first radio port $51_1$ by using the radio frequencies f1 and f1'. A reception field strength measurement unit 63 for measuring the reception field strength in a plurality of frequencies is connected to the radio frequency transmission/reception unit 61 to select the fixed-mobile repeater frequency. Modulation/demodulation units $64_1$ and $64_2$ are circuits for modulating/demodulating a signal into a digital signal.

A subscriber line interface unit 65 is an interface circuit for inputting/outputting a signal to/from a fixed terminal 66. A data analysis unit 67 is a circuit for performing various analyses of received data. A channel synthesizing/separating unit 68 is a circuit for synthesizing a signal at the fixed terminal 66 with a signal at the mobile radio terminal $54_1$ through the radio frequency transmission/reception unit 61 or separates the signals. A control unit 69 has a CPU (Central Processing Unit) which is not illustrated and performs various control operations while integrating the various circuit sections of the fixed radio terminal. The control unit 69 is connected to the various circuit sections through a control signal line indicated by a dotted line in FIG. 6.

In the fixed radio terminal $53_1$, a radio port identifier, the assigned frequencies f1 and f1', and the time slot assigned to the fixed radio terminal $53_1$ are stored in a memory unit 70 on the basis of the notification information 41 described in FIG. 4. First, the reception field strength measurement unit 63 measures the reception field strengths of the plurality of radio frequencies prepared for communication in advance, which are different from the frequencies f1 and f1' and do not interfere with the frequencies f1 and f1'. Of these radio frequencies, one with the highest reception field strength is selected as the fixed-mobile repeater frequency used for communication with the mobile radio terminal $54_1$ present in the third service area $52_3$ and stored in the memory unit 70. In this case, the radio frequencies f3 and f3' are selected for the uplink and downlink, respectively, as the fixed-repeater mobile frequencies.

The channel synthesizing/separating unit 68 in the fixed radio terminal $53_1$ synthesizes a signal at the fixed terminal 66 with a signal to be relayed to the mobile radio terminal $54_1$ or separates the signals on the basis of an instruction from the control unit 69. The signal on the fixed terminal 66 side is transmitted to the first radio port $51_1$ through a permanently assigned slot in the frequency f1 or f1', which has been informed by notification information. Upon reception of a signal from the first radio port $51_1$ to the mobile radio terminal $54_1$, the signal of that time slot is separated by the channel synthesizing/separating unit 68 and input to the radio frequency transmission/reception unit 61 through the modulation/demodulation unit $64_1$.

The radio frequency transmission/reception unit 61 transmits a signal to be relayed to the mobile radio terminal $54_1$ in the third service area $52_3$ by using the frequency f3 stored in advance. On the other hand, information received from the mobile radio terminal $54_1$ using the frequency f3' is transmitted from the radio frequency transmission/reception unit 62 to the first radio port $51_1$ through the radio frequency transmission/reception unit 61 and the channel synthesizing/separating unit 68 by using the radio frequency f1'. At this time, a radio channel assigned between the fixed radio terminal $53_1$ and the radio port $51_1$ in advance is used to relay the mobile radio terminal $54_1$.

The mobile radio terminal $54_1$ checks the reception field strength at the destination using a reception field strength measurement unit 71 to select a radio frequency with the highest quality for communication. Therefore, When the mobile radio terminal $54_1$ comes close to the fixed radio terminal $53_1$, i.e., when the mobile radio terminal $54_1$ enters the third service area $52_3$, the mobile radio terminal $54_1$ also selects the same radio frequencies as the fixed-mobile repeater frequencies f3 and f3' selected on the fixed radio terminal $53_1$ side. For this reason, the mobile radio terminal $54_1$ can perform communication through a radio frequency measurement unit 72 and a modulation/demodulation unit 73 without particularly identifying whether the mobile radio terminal $54_1$ is communicating with the first radio port $51_1$ or relaying the fixed radio terminal $53_1$ for communication.

Second Modification

Figure 7:
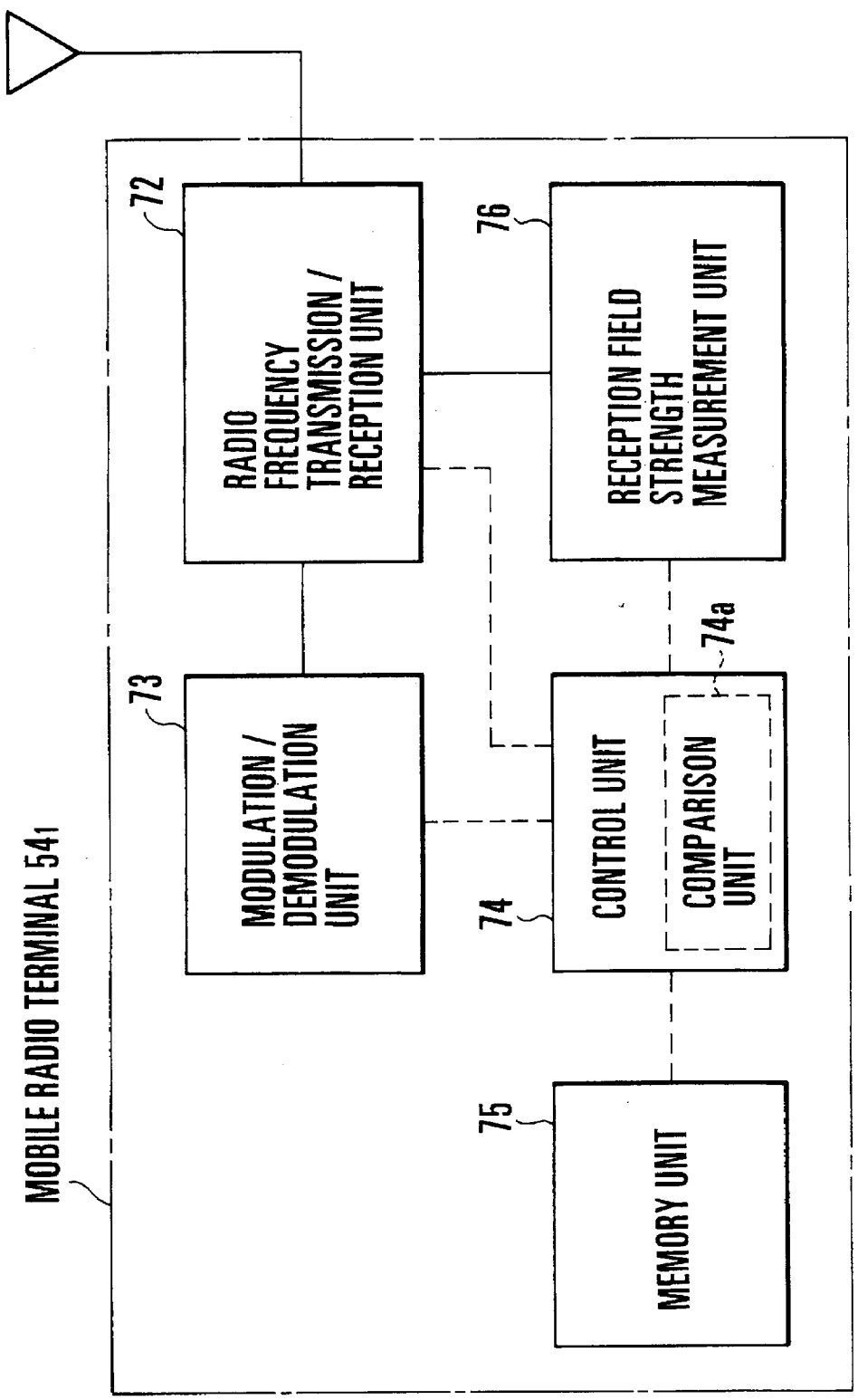
FIG. 7 is a block diagram schematically showing the arrangement of a mobile radio terminal in the second modification of the system shown in FIG. 1.
Figure 8:
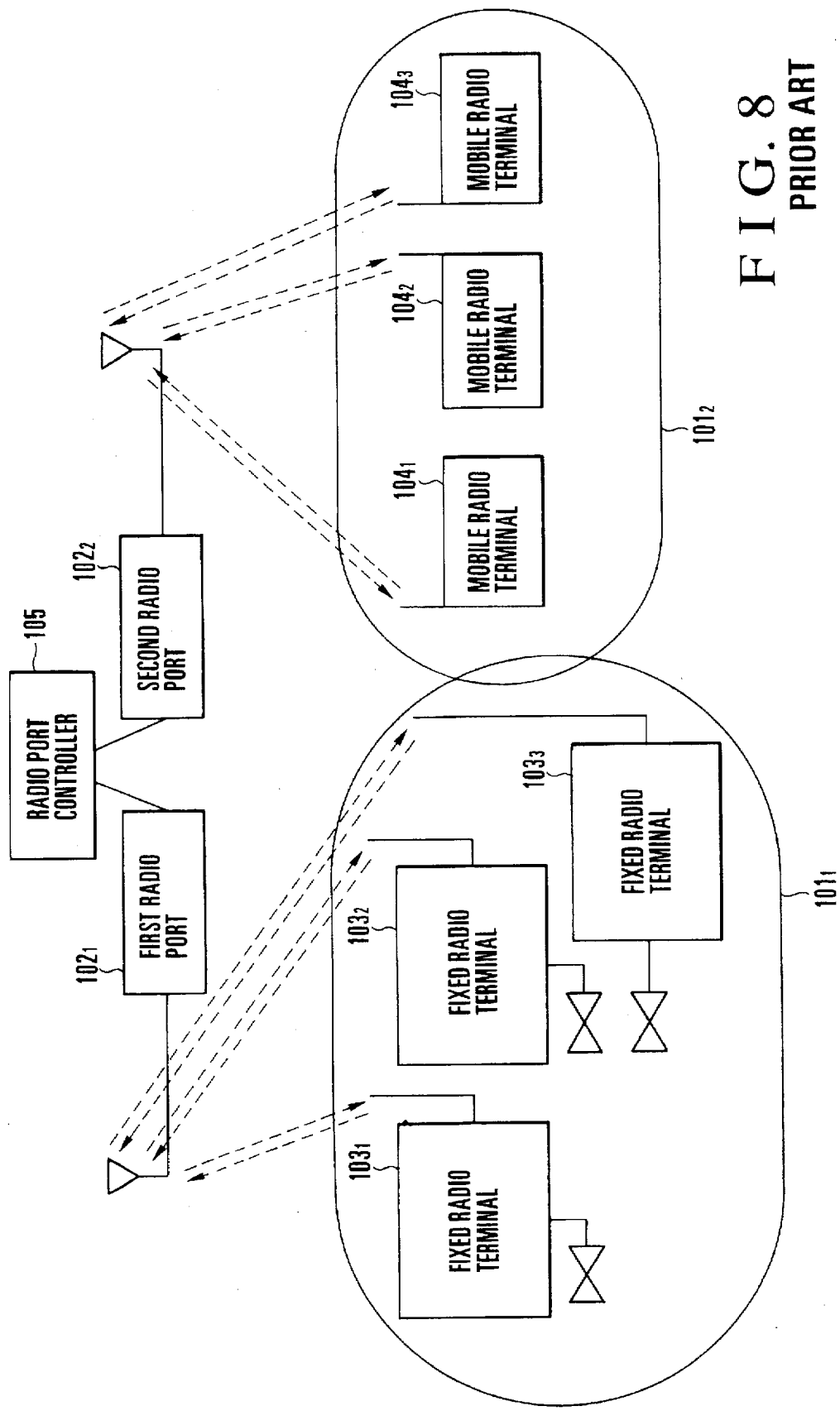
FIG. 8 is a view schematically showing the system configuration of a conventional radio communication system.

In the second modification shown in FIG. 7, it is determined whether the mobile radio terminal $54_1$ is present in the repeater area $52_3$ of the fixed radio terminal $53_1$ having the same subscriber number as that of the mobile radio terminal $54_1$. The radio communication system and the fixed radio terminal $53_1$ of the second modification have the same configuration as that shown in FIGS. 5 and 6. However, the fixed radio terminal $53_1$ and the mobile radio terminal $54_1$ in the third service area $52_3$ have the same subscriber number. As in the first modification, in the fixed radio terminal $53_1$, a radio port identifier, the assigned frequencies f1 and f1', and the assigned time slot, which have been informed by notification information, are stored in the memory unit 70 in advance. Assume that the fixed-mobile repeater frequencies f3 and f3' are determined in advance. As shown in FIG. 7, in the mobile radio terminal $54_1$, the fixed-mobile repeater frequencies f3 and f3' used by the fixed radio terminal $53_1$ having the same subscriber number as that of the terminal $54_1$ and the identifier of a radio port for controlling the service area are stored in a memory unit 75 in advance.

A control unit 74 of the mobile radio terminal $54_1$ recognizes the radio port identifier informed in the destination area. A reception field strength measurement unit 76 grasps the fixed-mobile repeater frequency selected on the basis of the reception field strength. A comparison unit 74a of the control unit 74 compares the fixed-mobile repeater frequency and the radio port identifier used by the fixed radio terminal $53_1$ having the same subscriber number as that of the terminal $54_1$, which are stored in the memory unit 75 in advance, with those of the mobile radio terminal $54_1$. If both the radio port identifiers and the radio frequencies coincide with each other, it is recognized that the mobile radio terminal $54_1$ enters the third service area $52_3$ as the repeater area of the fixed radio terminal $53_1$ having the same subscriber number as that of the terminal $54_1$. If the radio port identifiers coincide with each other, and the fixed-mobile repeater frequencies do not coincide, it is identified that the mobile radio terminal $54_1$ is present in the service area $52_1$ of the radio port $51_1$ for controlling the fixed radio terminal $53_1$ having the same subscriber number as that of the terminal $54_1$ and outside the repeater area $52_3$ of the fixed radio terminal $53_1$. If neither the fixed-mobile repeater frequencies nor the radio port identifiers coincide with each other, it is determined that the mobile radio terminal $54_1$ is located outside the service area $52_1$ of the radio port $51_1$ for controlling the fixed radio terminal $53_1$ having the same subscriber number as that of the terminal $54_1$.

For example, when it is determined, on the basis of the two pieces of information, i.e., the radio port identifier and the fixed-mobile repeater frequency, that the mobile radio terminal $54_1$ is present in the third service area $52_3$ in FIG. 5, communication is performed using the fixed-mobile repeater frequencies f3 and f3'. In addition, communication between the fixed radio terminal $53_1$ and the first radio port $51_1$, which is performed to relay the mobile radio terminal $54_1$, is performed using a channel permanently assigned to the fixed radio terminal $53_1$. When it is determined that the mobile radio terminal $54_1$ is present in the first service area $52_1$ in FIG. 5 and outside the third service area $52_3$, a service request is output to the first radio port $51_1$ to obtain an accessible slot for mobile radio terminals in the radio frequency f1 or f1'. When the mobile radio terminal $54_1$ is present outside the first service area $52_1$ and the third service area $52_3$, e.g., when it is determined that the mobile radio terminal $54_1$ is present in the second service area $52_2$, a service request is output such that communication is performed through an accessible slot in the frequency f2 or f2' of the second radio port $51_2$.

In many cases, residents in a house where the fixed radio terminal is set often possess mobile radio terminals having the same subscriber number as that of this fixed radio terminal. In the second modification, it is determined on the mobile radio terminal $54_1$ side whether the mobile radio terminal is in the repeater area $52_3$ of the fixed radio terminal $53_1$ having the same subscriber number as that of the mobile radio terminal. Only when the subscriber number is the same, a service request is output to use the fixed-mobile repeater frequency. For this reason, in use in the house where the fixed radio terminal $53_1$ having the same subscriber number as that of the mobile radio terminal is set, a radio channel can be unconditionally ensured, like the fixed radio terminal $53_1$. More specifically, only the mobile radio terminal $54_1$ having the same subscriber number as that of the fixed radio terminal uses the fixed-mobile repeater frequency. Therefore, even when another mobile radio terminal enters the repeater area, the mobile terminal cannot use the channel assigned to the fixed radio terminal $53_1$.

In addition, in an area located outside the repeater area $52_3$ of the fixed radio terminal $53_1$ having the same subscriber number as that of the mobile radio terminal $54_1$, the mobile radio terminal $54_1$ and the fixed radio terminal $53_1$ use different radio channels. For this reason, the radio port controller 56 can discriminate the mobile radio terminal $54_1$ from the fixed radio terminal $53_1$ although they have the same subscriber number. When the mobile radio terminal $54_1$ enters the repeater area $52_3$ of the fixed radio terminal $53_1$ having the same subscriber number as that of the terminal $54_1$, the radio port controller 56 cannot discriminate the two terminals from each other. However, since determination can be made on the fixed radio terminal $53_1$ side, no problem is posed. In addition, position registration for receiving a terminating call need be performed only on the mobile radio terminal $54_1$ side because the fixed radio terminal $53_1$ does not change its position. In the first radio area $52_1$, a terminating call must be received on the mobile radio terminal $54_1$ side. That is, the fixed radio terminal $53_1$ must be used stand-alone only for call origination.

The positions and numbers of fixed radio terminals and mobile radio terminals in the service areas are not limited to those in the above-described embodiment and first and second modifications. This is also applied to the radio frequencies and time slot assignment.

As has been described above, according to the present invention, a radio channel can be ensured at any time because a channel is permanently assigned to the fixed radio terminal, so that a similar service as that of a wire terminal can be provided. In addition, the mobile radio terminal can be notified of a channel assigned to the fixed radio terminal at the destination and output a service request through another channel. Furthermore, even when the mobile radio terminal and the fixed radio terminal have the same subscriber number, it can be identified on the radio port side whether the source of the service request is the fixed radio terminal or mobile radio terminal because the channels are different.

The fixed radio terminal has a repeater area where the fixed radio terminal is included. When the mobile terminal enters the area, the fixed radio terminal relays communication between the radio port and the mobile radio terminal. For example, a radio wave from the radio port becomes weaker in a house or frontage. However, when the fixed radio terminal set in the house is used to relay communication, satisfactory communication can be performed by the mobile radio terminal even in the house.

Communication is relayed only when the mobile radio terminal enters the repeater area of the fixed radio terminal having the same subscriber number as that of the mobile radio terminal, so another subscriber cannot use the ensured radio channel. Therefore, every time the mobile radio terminal enters the repeater area of the fixed radio terminal having the same subscriber number as that of the mobile radio terminal, a channel can be ensured, and the same service as that of a wire terminal can be received.

As a repeater radio frequency, a frequency which does not interfere with a radio frequency used by the radio port is selected. Therefore, satisfactory communication can be ensured in the repeater area.

The repeater radio frequency used by the fixed radio terminal having the same subscriber as that of the mobile radio terminal and the identifier of the radio port for controlling this terminal are stored in advance on the mobile terminal side. When the radio frequency detected at the destination and the notified radio port identifier are compared with the repeater radio frequency and the radio port identifier, which are stored, it is determined whether the mobile radio terminal is present in the repeater area of the fixed radio terminal having the same subscriber number as that of the mobile radio terminal. With this arrangement, it can be relatively easily identified whether the mobile radio terminal is present in the repeater area of the fixed radio terminal having the same subscriber number as that of the mobile radio terminal.

What is claimed is:

1. A radio communication system comprising:

a radio port for communicating with a fixed radio terminal and a mobile radio terminal that provide similar services in a service area by using a predetermined radio frequency which is multiplexed by time division into a plurality of radio channels;

said fixed radio terminal being stationarily set in said service area of said radio port and having first transmission/reception means for communicating with said radio port by using a one of the radio channels in the predetermined radio frequency which is permanently assigned in advance;

memory means for storing said radio channel assigned in advance to said fixed radio terminal;

notification means for providing information, including said radio channel stored in said memory means, said information being provided in said service area of said radio port through said radio port; and said mobile radio terminal in said service area for communicating with said radio port by using a further one of the radio channels in the predetermined radio frequency not assigned to said fixed radio terminal on the basis of said information provided in said service area of said radio port.

2. A system according to claim 1, wherein said fixed radio terminal further comprises second transmission/reception means for communicating with said mobile radio terminal present in a predetermined repeater area of said fixed radio terminal by using a repeater radio frequency different from the predetermined radio frequency, said fixed radio terminal relays transmission/reception information by said second transmission/reception means by using said first transmission/reception means and the radio channel assigned in advance to said fixed radio terminal, said mobile radio terminal for communicating with said radio port by using the repeater radio frequency through said fixed radio terminal when said mobile radio terminal is in said repeater area, and said mobile radio terminal for communicating with said radio port by using the radio channel not assigned to said fixed radio terminal on the basis of the information provided by said notification means when said mobile radio terminal is outside said repeater area and in said service area of said radio port.

3. A system according to claim 2, wherein the repeater radio frequency is a frequency which does not interfere with the predetermined radio frequency used between said fixed radio terminal and said radio port.

4. A system according to claim 2, wherein said mobile radio terminal communicates with said radio port through said fixed radio terminal by using the repeater radio frequency when said mobile radio terminal enters said repeater area of said fixed radio terminal having a subscriber number that is the same as that of said mobile radio terminal.

5. A system according to claim 4, wherein said mobile radio terminal comprises, memory means for storing the repeater radio frequency assigned in advance to said fixed radio terminal having the identical subscriber number and a radio port identifier representing said radio port for controlling said service area where said fixed radio terminal having the identical subscriber number is set, detection means for detecting a radio frequency having the highest reception field strength, comparison means for comparing to determine whether the radio frequency detected by said detection means and the radio port identifier included in the information provided by said notification means coincide with the repeater radio frequency and the radio port identifier, which are stored in said memory means, and control means for determining that said mobile radio terminal enters said repeater area of said fixed radio terminal having the same subscriber number as that of said mobile radio terminal when two comparison results from said comparison means represent coincidence.

6. A radio communication system comprising:

a radio port for communicating in a first service area by using a predetermined radio frequency which is multiplexed by time division into a plurality of radio channels;

a fixed radio terminal stationarily set in said service area of said radio port and having first transmission/reception means for communicating with said radio port by using a one of the radio channels in the predetermined frequency which is permanently assigned in advance;

memory means for storing said radio channel assigned in advance to said fixed radio terminal;

notification means for providing information, including said radio channels stored in said memory means, said information being provided in said service area of said radio port through said radio port;

a mobile radio terminal for communicating with said radio port by using a further one of the radio channels in the predetermined radio frequency not assigned to said fixed radio terminal on the basis of said information provided in said service area of said radio ports;

wherein said fixed radio terminal further comprises second transmission/reception means for communicating with said mobile radio terminal when it is present in a predetermined repeater area of said fixed radio terminal by using a repeater radio frequency different from the predetermined radio frequency, said fixed radio terminal relaying transmission/reception information by said second transmission/reception means by using said first transmission/reception means and the radio channel assigned in advance to said fixed radio terminal, said mobile radio terminal for communicating with said radio port by using the repeater radio frequency only when said mobile radio terminal enters said repeater area of said fixed radio terminal and has a subscriber number that is the same as that of said mobile radio terminal, and said mobile radio terminal for communicating with said radio port by using the radio channel not assigned to said fixed radio terminal on the basis of the information provided by said notification means when said mobile radio terminal is outside said repeater area and inside said service area of said radio port.

7. A system according to claim 6, wherein said fixed radio terminal comprises, memory means for storing information of a radio port identifier, the assigned predetermined radio frequency, and a time slot permanently assigned, which is included in the information provided by said notification means, and first detection means for detecting, from a plurality of radio frequencies prepared in advance for communication, a frequency different from the predetermined frequency and having the highest reception field strength as the repeater radio frequency and storing the repeater radio frequency in said memory means, and wherein said fixed radio terminal communicates with said mobile radio terminal and said radio port in accordance with the information stored in said memory means.

8. A system according to claim 7, wherein said mobile radio terminal comprises second detection means for detecting, from the plurality of radio frequencies prepared in advance for communication, a frequency different from the predetermined frequency and having the highest reception field strength as the repeater radio frequency, and wherein said mobile radio terminal communicates with said fixed radio terminal by using the detected repeater radio frequency.

* * * * *